United States Patent [19]
Herzl

[11] 3,854,334
[45] Dec. 17, 1974

[54] SIGNAL RECOVERY SYSTEM FOR VORTEX TYPE FLOWMETER

[75] Inventor: Peter J. Herzl, Morrisville, Pa.

[73] Assignee: Fischer & Porter Company, Warminster, Pa.

[22] Filed: Oct. 1, 1973

[21] Appl. No.: 402,387

[52] U.S. Cl. .............................................. 73/194 B
[51] Int. Cl. .............................................. G01f 1/00
[58] Field of Search ................................. 73/194 B

[56] References Cited
UNITED STATES PATENTS
3,572,117   3/1971   Rodely ............................. 73/194 B
3,709,034   1/1973   Herzl ............................... 73/194 B Primary Examiner—James J. Gill

[57] ABSTRACT

A signal recovery system for a vortex-type flowmeter wherein the fluid to be measured is directed past a vortex-producing element to induce fluidic variations whose fundamental frequency is a function of flow rate. The variations are detected by a sensor yielding an electrical signal subject to fading due to flow disturbances. In order to produce an output signal accurately representing flow rate which is continuous despite fading of the sensor signal, the signal recovery system to which the sensor signal is applied, includes an electronic flywheel synchronized to the fundamental frequency of the flowmeter and maintaining the output of the system when the sensor signal fades.

9 Claims, 8 Drawing Figures

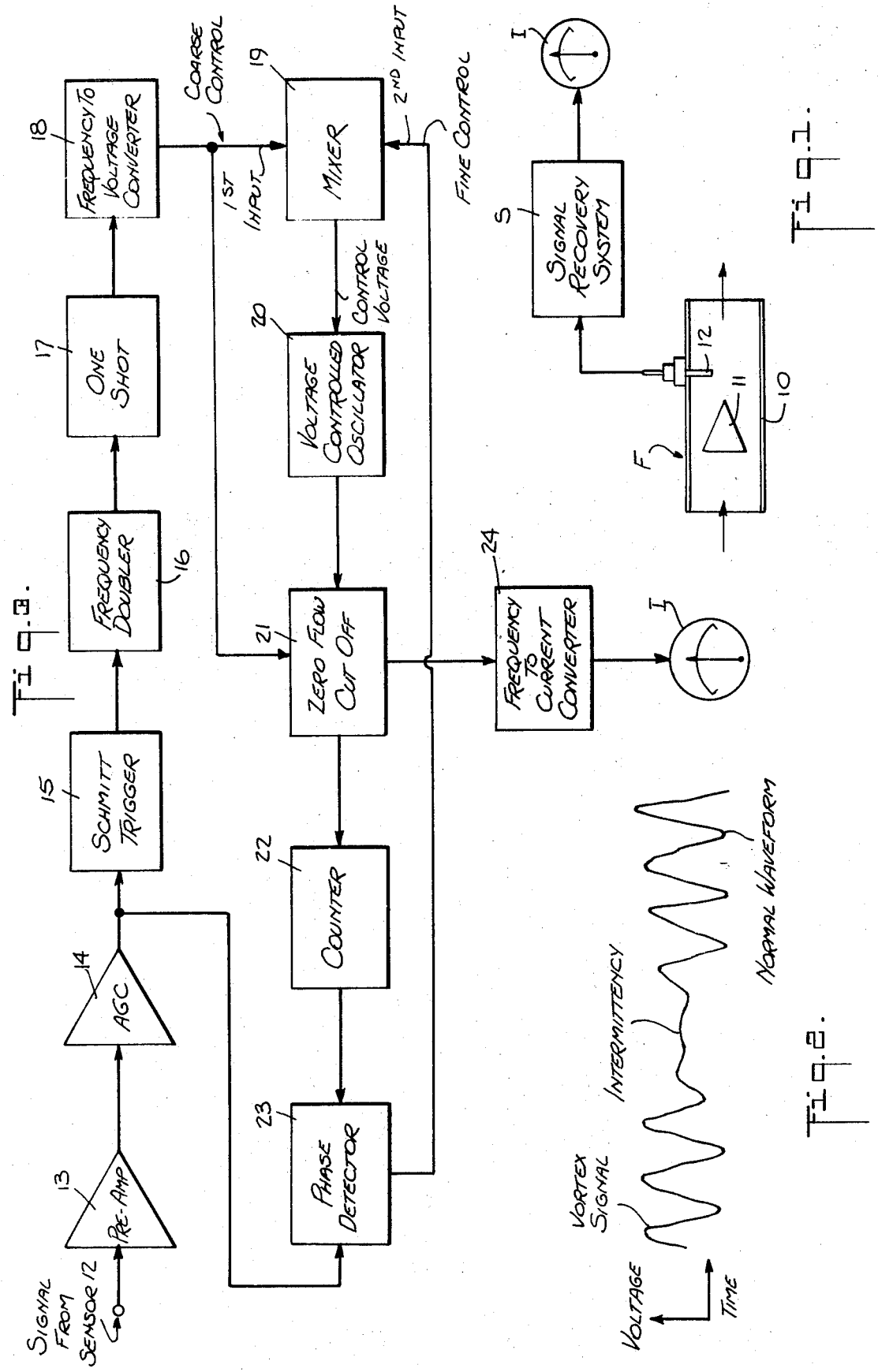

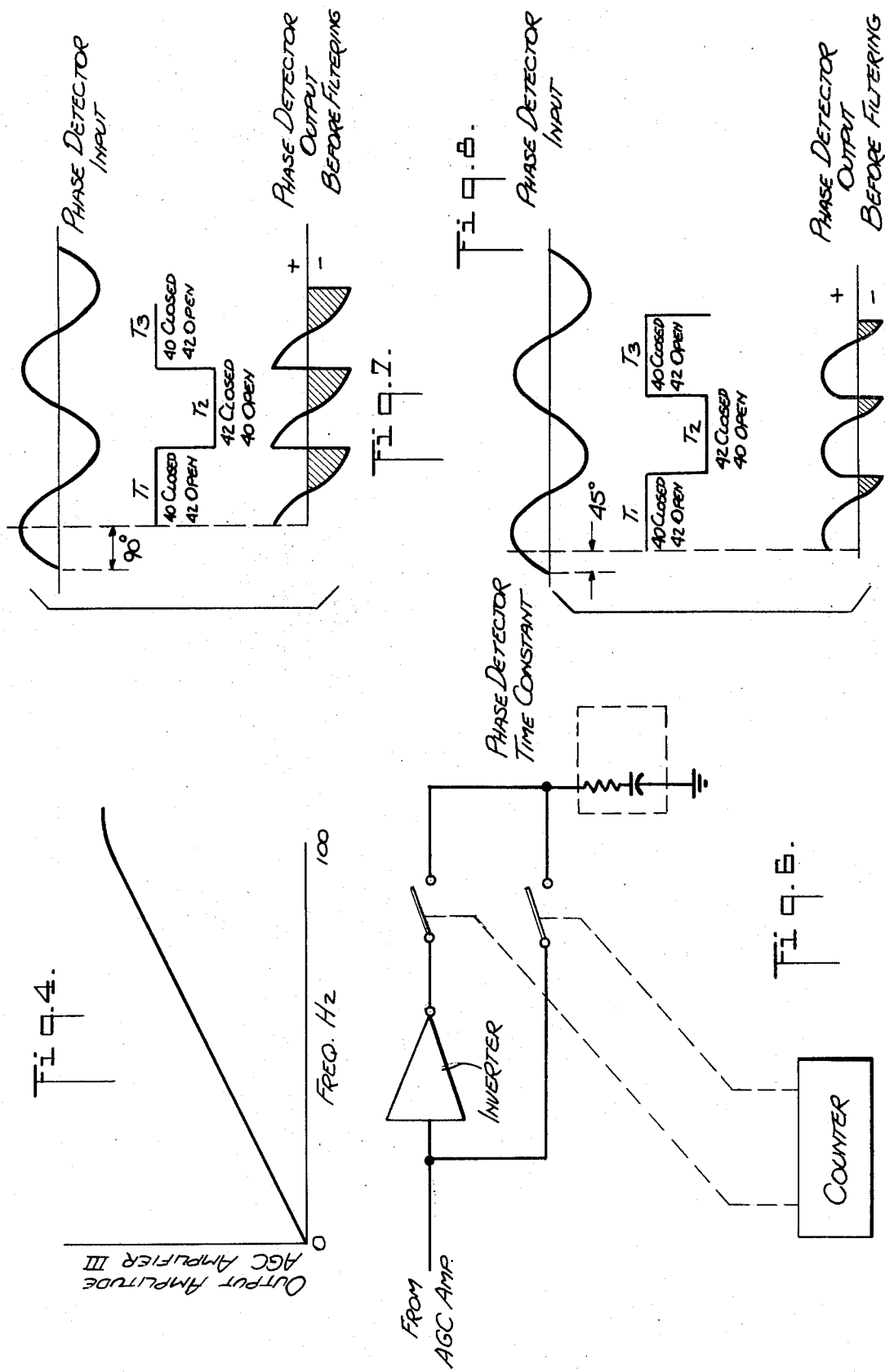

SIGNAL RECOVERY SYSTEM FOR VORTEX TYPE FLOWMETER

BACKGROUND OF THE INVENTION

This invention relates generally to vortex-type flowmeters, and more particularly to a signal recovery system for such meters for producing a signal whose frequency represents flow rate and for maintaining this signal when vortex shedding fades for a brief period.

A vortex-type flowmeter is adapted to measure the flow rate of a fluid passing through a conduit by producing fluidic pulses or oscillations whose repetition rate or frequency varies in accordance with flow rate. Two species of vortex-type meters are commercially available in the United States, one being the so-called Swirlmeter type, and another, the bluff-body type. The present invention is not limited to these specific types and is applicable to all forms of hydrodynamic oscillatory metering devices in which fluidic variations are sensed to provide an indication.

In Swirlmeters, such as those described in U.S. Pat. No. 3,279,251, 3,314,289 and Re. 26,410, among others, a homogeneous fluid whose flow rate is to be measured, is forced to assume a swirl component. This is accomplished by feeding the fluid into the inlet section of a flow tube having a fixed set of swirl blades therein which imparts a swirling motion to the fluid passing therethrough. Downstream of the swirl blades in the tube is a Venturi section which first constricts and then expands the flow passage to transform the swirling motion into precessional movement in the expanding region of the Venturi section to create a vortex.

Precession takes place about the central axis of the flow tube at a discrete frequency that is a function of the volumetric flow rate. Cyclic variations in local fluid velocity occurring by reason of precession are detected to provide electrical pulses whose frequency is measured to provide an indication of flow rate.

In the bluff-body type of vortex meter, such as those described in U.S. Pat. Nos. 3,116,639 and 3,587,312, the body is mounted within the flow conduit transversely with respect to the flow axis thereof to create fluidic oscillations whose frequency is proportional to flow rate. Other types of bluff-body flowmeters are disclosed in U.S. Pat. Nos. 3,116,639 and 3,587,312. The invention is also applicable to vortex type meters in which the obstacle in the conduit is positioned along the flow axis.

In a vortex-type flowmeter, in addition to the periodic fluidic variations which are induced within the meter, fluidic variations may be present which arise from random flow disturbances such as turbulence created in the fluid before it is admitted into the flow tube. One of the major problems heretofore encountered in such meters is that of fading or intermittency. This fading or discontinuity can be explained by the relatively weak natural forces setting up the vortex shedding. These weak forces may be temporarily overcome by flow disturbances which greatly reduce the amplitude of vortex shedding or completely disrupt the shedding. Shortly after the disturbance has passed, vortex shedding is resumed and is returned to normal strength.

To minimize such fading problems, two methods or combinations thereof have heretofore been employed. One method is to reduce flow disturbances so that the fluid entering the vortex type meter is relatively free of turbulence and whatever turbulence remains is not sufficient to interfere with the vortex shedding phenomenon. This is accomplished by passing the fluid through long and straight runs of pipe before the fluid is permitted to enter the flowmeter. But this approach adds substantially to the cost of the installation. In some instances it may not be convenient or feasible to provide extended pipe runs in advance of the flowmeter.

Another approach, such as that taken in U.S. Pat. No. 3,572,117, is to design the obstacle assembly to produce stronger fluidic oscillations having a high signal-to-noise ratio. But even such shedders will not overcome intermittency if the flow disturbances are large.

SUMMARY OF THE INVENTION

In view of the foregoing, it is the main object of this invention to provide in conjunction with a vortex-type flowmeter, a signal recovery system for producing a signal whose frequency represents flow rate and for maintaining the signal when vortex shedding is momentarily disrupted so that a continuous measuring signal is produced despite intermittency or fading.

A significant advantage of the present invention is that it does away with the need for special installations to minimize flow disturbances. Moreover the signal recovery system improves the behavior of any existing form of vortex-shedding flowmeter operating under unfavorable flow conditions.

More specifically, it is an object of this invention to provide a signal recovery system which incorporates an electronic flywheel synchronized to the frequency of vortex shedding, such that when vortex shedding fades for a brief period, the electronic flywheel maintains the output of the system to produce a continuous signal whose frequency accurately represents flow rate. Furthermore, the flywheel removes small irregularities caused by flow turbulence and affords a steadier output.

Briefly stated, these objects are attained in a system in which a frequency-to-current converter produces a voltage whose amplitude is dependent on the frequency of the signal yielded by the flowmeter sensor, the converter time constant having a relatively slow decay rate, so that in the absence of the sensor signal because of fading, the voltage yielded by the converter is sustained for a brief period.

The output of the converter acts to govern a voltage-controlled-oscillator whose frequency is dependent on the amplitude of the voltage applied thereto and hence tracks the fundamental frequency of the sensor signal which is proportional to flow rate. Inasmuch as the control voltage applied to the voltage-controlled-oscillator is sustained for a brief period in the absence of a sensor signal, the oscillator in combination with the frequency-to-voltage converter acts as an electronic flywheel to produce a continuous signal overcoming the effects of fading and intermittency. The frequency of the voltage-controlled-oscillator is synchronized with the fundamental frequency by means of a phase detector whose output voltage is also applied to the voltage-controlled-oscillator.

OUTLINE OF THE DRAWINGS

For a better understanding of the invention as well as other objects and further features thereof, reference is made to the following detailed description to be read in conjunction with the accompanying drawings, wherein:

FIG. 1 is a simplified diagram of a vortex-type flowmeter, including a signal recovery system in accordance with the invention;

FIG. 2 is a waveform showing the output of the flowmeter sensor;

Figure 3:
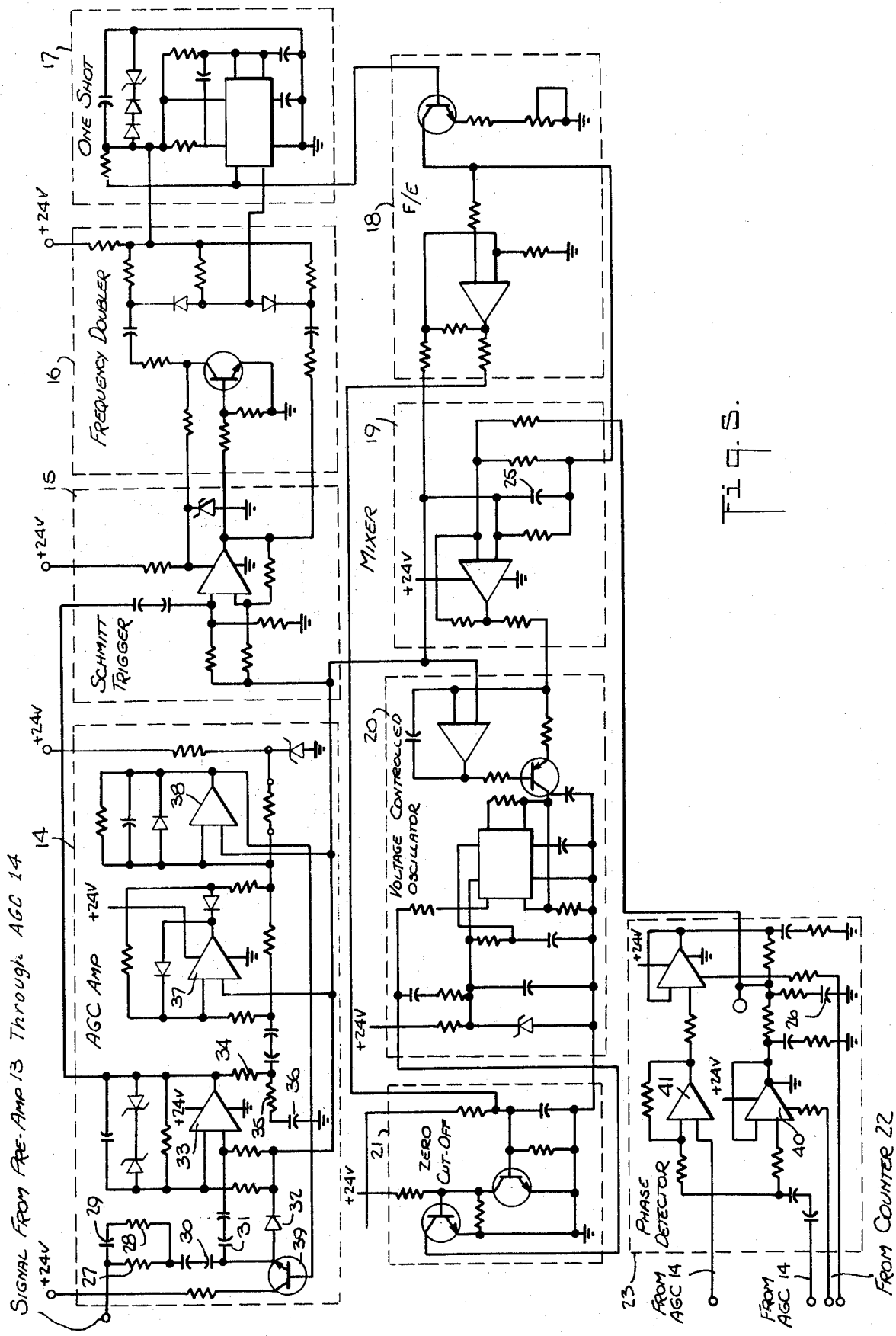
FIG. 3 is a block diagram of the signal recovery system.

FIG. 4 graphically illustrates the characteristics of the automatic-gain-control amplifier included in the system;

FIG. 5 is a schematic circuit diagram of certain stages of the system;

FIG. 6 is an equivalent block diagram of the phase detector included in the system;

FIG. 7 shows waveforms of the phase detector input and output in the synchronized condition; and FIG. 8 shows the waveforms of the phase detector input and output in a phase displaced condition.

DESCRIPTION OF THE INVENTION

The Basic System

Referring now to FIG. 1, there is shown a signal recovery system, generally designated as S, operating in conjunction with a vortex-type flowmeter F for producing a signal whose frequency represents flow rate, the signal being maintained when vortex shedding in flowmeter F fades or is randomly intermittent of brief periods.

By way of example, the vortex meter F is of the bluff-body type, and includes a flow tube 10 for conducting the fluid whose flow rate is to be measured, a bluff body 11 mounted in the tube and serving as a flow obstacle giving rise to vortex shedding phenomenon, and a sensor 12 responsive to the resultant fluidic pulses to produce a signal which is processed by signal recovery system S. The output of the system is applied to a suitable indicator I calibrated in terms of flow rate.

In a vortex-type meter, the signal produced by sensor 12 is represented by the wave form illustrated in FIG. 2 where it will be seen that the signal varies in frequency in accordance with flow rate and has an intermittency wherein the signal becomes very weak in amplitude. Such intermittency or signal fading occurs at random, unpredictable periods during the flow and therefore precludes accurate flow measurements even with sophisticated signal conditioning systems and calibrating procedures.

The unique feature of signal recovery system S is that is incorporates an electronic flywheel which is synchronized to the fundamental frequency of vortex shedding, whereby when shedding fades out for a short period of time, the electronic flywheel sustains its output and creates an uninterrupted signal.

To accomplish this result, in a preferred embodiment of the invention shown in FIG. 3, the signal from sensor 12 is applied to the pre-amplifier stage 13 of the signal recovery system S, the output of stage 13 being fed to a frequency sensitive automatic-gain-control (AGC) amplifier 14. Amplifier 14 has two distinct functions, the first of which is to yield a known output irrespective of the input. The second function is to provide an output voltage proportional to frequency, so that the higher the frequency, the larger the output voltage.

The relationship between the output amplitude of AGC amplifier 14 and output frequency is graphically shown in FIG. 4 in which the output amplitude is plotted against frequency in a 0-100 Hz range.

The output of AGC amplifier 14 is applied to a Schmitt trigger 15 or other form of trigger circuit to produce a square-wave whose frequency is identical to the fundamental frequency. A Schmitt trigger is a bi-stable circuit that converts an A-C input signal into a square-wave output signal by a switching action triggered at a predetermined point in each positive and negative swing of the input signal.

Should a small conversion error occur due to a noise signal or signal fading, this does not matter for the Schmitt trigger output is only used to effect coarse setting of a voltage-controlled-oscillator (to be later described) functioning as the electronic flywheel.

The square wave output of Schmitt trigger 15 is applied to a frequency doubler 16 whose output is converted into a voltage proportional to the applied frequency means of a one-shot stage 17 followed by a frequency-to-voltage (F/E) converter 18. The output of converter 18 is applied to one input of a mixer 19 whose output voltage governs a voltage-controlled-oscillator (VCO) 20 which in this embodiment is operated at a multiple of four times the fundamental frequency. In practice, however, other multiples from one to as high as desirable, are possible. The signal from VCO 20 is applied to a counter 22 through a zero flow cut-off stage 21 which, when the frequency falls below a predetermined value, arrests the output.

The output frequency of counter 22 is compared with the fundamental frequency yielded in the output of AGC amplifier 14 in a phase detector 23 adapted to produce an output whose amplitude is a function of the output amplitude of AGC amplifier 14, the output of the detector also being a function of the phase displacement between the fundamental frequency and the counter frequency.

The output of phase detector 23 is applied as the second input to mixer 17 whose output governs VCO 20 and thereby locks in the frequency of the voltage-controlled-oscillator with the fundamental frequency. Thus the frequency of oscillator 20 now reflects the flow rate and varies in accordance therewith.

Otherwise stated, the first input to mixer 17, derived from Schmitt trigger 15 and F/V converter 18, produces an output in the mixer which is applied to the VCO stage to coarsely set the operating frequency thereof, whereas the second input to the mixer derived from phase detector 23 brings about a fine correction to effect synchronization. The output frequency of oscillator 20 is converted into a corresponding value of current in the frequency-to-current converter 24 whose output is applied to flow-rate indicator I.

For voltage-controlled-oscillator 20 to act as a flywheel maintaining the output regardless of fading, synchronization of the oscillator with the fundamental frequency must be fast on small input deviations, and the decay must be relatively slow in the absence of an input. These two time constants can be controlled independently in a system in accordance with the invention. The decay characteristic is set by the time constant of frequency-to-voltage converter 18.

The circuit of frequency-to-voltage converter 18 and of several other stages of the system is shown in FIG. 5. The filter capacitor 25 for determining the decay time of converter 18 is actually located in mixer 19. The time constant of phase detector 23 is set by capacitor 26.

Synchronization

In the foregoing discussion, it has been assumed that voltage-controller-oscillator 20 will automatically end up at the correct operating frequency. While this is true in a system covering a relatively narrow frequency range, it does not necessarily hold for a system having a broad frequency range, for in the latter case there is a possibility that the oscillator will lock in on a harmonic of the basic operating frequency. The arrangement disclosed herein eliminates this possibility, for oscillator 20 will always lock-in with the fundamental frequency even when the operating range of the meter is broad.

To illustrate this problem, an example based on the following four assumptions will now be considered:

I. The phase detector 23 has a maximum output of ±3 volts, with a constant input voltage.

II. VCO 20 is a linear device having a frequency of 100 Hz for a 5 volt input and a frequency of zero Hz for a zero volt input.

III. Phase detector 23 will produce one quarter of its maximum output on the first harmonic of the signal frequency or ±0.75 volts.

IV. At the outset, the system is at 100 Hz.

By definition, the control input voltage to VCO 20 to produce a 100 Hz output equals 5 volts. This control input voltage is generated in mixer 19 by the addition of the voltage from F/E converter 18 (coarse control) and the voltage from phase detector 23 (fine control to effect sync.).

Now let us assume a step change in the frequency from 100 Hz to 10 Hz. The coarse voltage input will start to decay until it reaches 0.5 volts, the value necessary to produce 10 Hz. As the system passes 20 Hz, which is the first higher harmonic, phase detector 23 will develop an output of 0.75 volts (Assumption III).

This 0.75 voltage, added to the 0.5 volt coarse setting input, is more than enough to produce the 1 volt required by VCO 20 to operate at 20 Hz, and the system would therefore tend to lock-in on the first harmonic. The problem would be even worse had the step change in frequency been larger. If the output of phase detector 23 were lowered, the situation would improve but a longer time would be required to attain synchronization and the flywheel recovery time would be poor.

There is the further problem of loop gain. When voltage-controlled-oscillator 20 dwells at 100 Hz, with an input voltage of 5 volts, the ±3 volt swing of phase detector 23 represents approximately a 60 percent frequency change for the oscillator. But at 10 Hz, with an input voltage of 0.5 volt to oscillator 20, the ±3 volt swing of the phase detector represents approximately a 600 percent frequency change to the oscillator. This constitutes a 10 to 1 change in system loop gain. Obviously, one or the other is not optimum for fast synchronization and system stability.

In a system in accordance with the invention, this problem is obviated by designing the phase detector to have an output proportional to the signal amplitude of the fundamental frequency. The amplitude of this fundamental signal is controlled by AGC amplifier 14 so that its amplitude is approximately proportional to frequency. For example, the amplitude of the signal would give phase detector 23 a sensitivity of ±3 volts at 10 Hz. Reverting to the earlier numerical examples, it will be seen that lock-in on harmonics cannot now occur. Also, loop gain at 10 Hz equals loop gain at 100 Hz.

Since automatic-gain-control amplifier 14 and phase detector 12 play an important role in the system operation, a more detailed explanation of these units will now be given. These designs as shown schematically in FIG. 5 are simple and feasible but other circuits with similar performance characteristics can be substituted therefor.

Automatic-gain-control amplifier

The function of AGC amplifier 14 is to produce the output characteristics shown in FIG. 4. These output characteristics must be maintained for a considerable variation of input signal to the amplifier.

Referring to FIG. 5, the sensor signal from preamplifier 13 enters amplifier 14 through a variable attenuator whose fixed section is made up of resistors 27 and 28 and capacitors 29, 30 and 31. The variable section of the attenuator comprises diode 32. Direct current is passed through diode 32 to vary its A-C impedance. At zero current, the diode impedance is very high and as current is increased the impedance drops. In other words, diode 32 functions as a variable impedance.

The signal is then passed through an operational amplifier 33 with fixed gain characteristics. The output of amplifier 33 is fed to a low-pass filter network made up of resistors 34 and 35 and capacitor 36. The output from this network appears at the junction of resistors 34 and 35. Since the A-C impedance of capacitor 36 drops as the frequency rises, attenuation increases as frequency goes up.

The output of the filter network is full-wave rectified, filtered and amplified by a pair of stages 37 and 38, and the resultant D-C voltage is applied to the base of transistor 39, causing a current to flow in diode 32, thereby closing the gain control loop. It is important to note that the A-C signal generating the D-C control voltage is held at a constant voltage, namely, the output of the filter network at the junction of resistors 34 and 35. Since this network attenuates high frequency, the output of the A-C amplifier 33 will rise with frequency.

Phase Detector

The function of phase detector 23 is to synchronize the oscillator. Its output must vary with input signal amplitude as well as with the phase error between the output frequency of counter 22 and the signal frequency.

The signal from automatic-gain-control amplifier 14 enters the phase detector, one branch going directly to electronic switch 40. The other branch is first inverted by amplifier 41 and then goes to electronic switch 42. The output of electronic switches 40 and 42 are joined and filtered. Electronic switches 40 and 42 are controlled respectively by the output and by the inversion of the output of counter 22. When one switch is on, the other is always off. The equivalent phase detector arrangement is illustrated in simplified block form in FIG. 6.

FIG. 7 shows the output wave form of phase detector 23 in the synchronized condition before filtering. This occurs with a 90° phase displacement between the signal and the counter frequency. It is to be noted that the filtered output would be 0, since the plus and minus segments are equal.

FIG. 8 shows the phase detector output before filtering, with a 45° phase displacement from the synchronized condition. It will be noted that the positive section is much larger than the negative section of the wave and the net filtered output will therefore be positive. Phase displacement in the opposite direction from synchronization will give a negative output. Examining the output of the phase detector in FIG. 8 it is apparent that if the signal were made larger, the net output would become larger. Also it will be evident that the output of the detector is amplitude as well as phase sensitive, which is a requirement for proper system operation.

While there has been shown a preferred embodiment of the invention, it will be appreciated that many changes and modifications may be made therein without departing from the essential spirit of the invention as disclosed herein.

I claim:

1. A signal recovery system for a vortex-type flowmeter wherein the fluid is directed past a vortex-producing element to cause vortex shedding at a fundamental frequency proportional to flow rate, said shedding being detected by a sensor yielding an electrical signal subject to intermittent fading for relatively brief periods due to flow disturbances which inhibit vortex shedding, said system comprising:
  A. an electronic flywheel constituted by a voltage-controlled-oscillator;
  B. means coupled to said sensor to produce a control voltage whose amplitude is a function of said fundamental frequency, said means having a relatively slow decay characteristic whereby the control voltage is sustained during fading periods;
  C. means applying said control voltage to said oscillator to generate an output frequency which depends on the amplitude of said voltage and which continues during said fading periods, and;
  D. means to drive a continuous flow rate indication from said oscillator output frequency.

2. A system as set forth in claim 1, wherein said vortex-producing element is an obstacle mounted in a flow conduit.

3. A system as set forth in claim 1, wherein said means coupled to said sensor includes a frequency-to-voltage converter to produce a control voltage whose amplitude is proportional to the frequency of the applied input.

4. A system as set forth in claim 3, wherein the output of said converter is applied as one input to a mixer whose output is applied to said oscillator to effect coarse control thereof, the other input of the mixer being derived from a phase detector which compares the fundamental frequency with a frequency derived from said oscillator to produce a voltage which is added in the mixer to the first input voltage to effect fine setting of the oscillator.

5. A system as set forth in claim 4, wherein said oscillator operates at a frequency which is a predetermined multiple of the fundamental frequency, and the frequency derived from said oscillator and applied to the phase detector is derived by a counter which divides down the oscillator frequency to correspond to the fundamental frequency.

6. A signal recovery system for a vortex-type flowmeter wherein the fluid is directed past a vortex-producing element to cause vortex shedding at a fundamental frequency proportional to flow rate, said shedding being detected by a sensor yielding an electrical signal subject to intermittent fading for relatively brief periods due to flow disturbances which inhibit vortex shedding, said system comprising:
  A. an electronic flywheel constituted by a voltage-controlled-oscillator operating at a multiple of the fundamental frequency;
  B. means to generate a coarse setting voltage for said oscillator including a trigger coupled to the sensor to produce square wave pulses at a corresponding rate, and a frequency-to-voltage converter coupled to the trigger to produce a first voltage whose amplitude is a function of said rate, said converter having a predetermined decay characteristic sustaining said first voltage during said fading,
  C. means to generate a fine setting voltage for said oscillator including a counter coupled to said oscillator to divide down the frequency thereof so that it corresponds to said fundamental frequency, and a phase detector coupled to said counter to compare the counter frequency with the fundamental frequency to produce a second voltage,
  D. a mixer to combine said first and second voltages to produce an output voltage which is applied to said oscillator to control same; and
  E. means to convert the output of said oscillator to a current for operating a flow rate indicator.

7. A system as set forth in claim 6, wherein said sensor output is applied to said trigger through an automatic-gain-control amplifier whose output amplitude is proportional to the frequency of the applied sensor signal, said phase detector comparing the output of said amplifier with the output of said counter.

8. A system as set forth in claim 6, wherein said trigger is a Schmitt trigger.

9. A system as set forth in claim 1, further including a frequency doubler to double the frequency of the trigger pulses applied to said converter.

* * * * *